US008654932B2

(12) United States Patent
Matityahu et al.

(10) Patent No.: US 8,654,932 B2
(45) Date of Patent: *Feb. 18, 2014

(54) INTELLIGENT COMMUNICATIONS NETWORK TAP PORT AGGREGATOR AND METHODS THEREOF

(75) Inventors: Eldad Matityahu, Palo Alto, CA (US); Bob Shaw, Los Gatos, CA (US); Xiaochun Liu, Pleasanton, CA (US); Stephen Strong, Fremont, CA (US)

(73) Assignee: Net Optics, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,373

(22) Filed: Jul. 19, 2010

(65) Prior Publication Data

US 2010/0278052 A1 Nov. 4, 2010

Related U.S. Application Data

(63) Continuation of application No. 11/370,487, filed on Mar. 7, 2006, now Pat. No. 7,760,859.

(60) Provisional application No. 60/659,512, filed on Mar. 7, 2005, provisional application No. 60/709,371, filed on Aug. 17, 2005.

(51) Int. Cl.
*H04M 1/24* (2006.01)
*H04M 3/08* (2006.01)
*H04M 3/22* (2006.01)

(52) U.S. Cl.
USPC ............... 379/22.06; 379/29.1; 379/32.01; 712/39; 712/43

(58) Field of Classification Search
USPC ......... 379/9, 9.02, 9.04, 9.06, 14, 15.01, 111, 379/112.01, 112.04, 112.05, 112.08, 379/112.09, 112.1, 133, 134, 135, 136, 379/412.02, 22.06, 29.1, 32.01, 112.06; 709/25, 39, 43, 51, 712, 717
See application file for complete search history.

(56) References Cited

U.S. PATENT DOCUMENTS

| 4,802,161 A | 1/1989 | Byars et al. |
| 5,173,794 A | 12/1992 | Cheung et al. |

(Continued)

FOREIGN PATENT DOCUMENTS

| JP | 2001-197066 A | 7/2001 |
| JP | 2006148686 A | 6/2006 |

(Continued)

OTHER PUBLICATIONS

"International Search Report", Issue in PCT Application No. PCT/US2006/25436; Mailing Date.: Mar. 4, 2008.

(Continued)

*Primary Examiner* — Binh Tieu
(74) *Attorney, Agent, or Firm* — IPSG, P.C.

(57) ABSTRACT

A network tap port aggregator for use in monitoring a network is provided. The network tap port aggregator includes a first device interface terminal for receiving a first network feed. The network tap port aggregator also includes a second device interface terminal for receiving a second network feed. The network tap port aggregator further includes a circuitry coupled with the first device interface terminal and with the second device interface terminal, the circuitry configured to monitor the first network feed and the second network feed and to aggregate the first network feed and the second network feed into an aggregated network feed. The network tap port aggregator yet also includes a first monitor interface terminal coupled to the circuitry for providing the aggregated network feed to a first network monitor that is external to the network tap port aggregator.

20 Claims, 4 Drawing Sheets

(56) References Cited

U.S. PATENT DOCUMENTS

| | | | |
|---|---|---|---|
| 5,648,965 A | 7/1997 | Thadani et al. | |
| 5,710,846 A | 1/1998 | Wayman et al. | |
| 5,715,247 A | 2/1998 | Nara et al. | |
| 5,781,318 A | 7/1998 | Tremblay | |
| 5,825,775 A | 10/1998 | Chin et al. | |
| 5,887,158 A | 3/1999 | Sample et al. | |
| 5,983,308 A | 11/1999 | Kerstein | |
| 6,041,037 A | 3/2000 | Nishio et al. | |
| 6,047,321 A | 4/2000 | Raab et al. | |
| 6,108,310 A | 8/2000 | Wilkinson et al. | |
| 6,167,025 A | 12/2000 | Hsing et al. | |
| 6,272,136 B1 | 8/2001 | Lin et al. | |
| 6,366,557 B1 | 4/2002 | Hunter | |
| 6,424,627 B1* | 7/2002 | Sørhaug et al. | 370/241 |
| 6,449,247 B1 | 9/2002 | Manzardo et al. | |
| 6,650,803 B1 | 11/2003 | Ramaswami et al. | |
| 6,658,565 B1 | 12/2003 | Gupta et al. | |
| 6,687,009 B2 | 2/2004 | Hui et al. | |
| 6,687,847 B1 | 2/2004 | Aguilera et al. | |
| 6,714,976 B1 | 3/2004 | Wilson et al. | |
| 6,798,740 B1 | 9/2004 | Senevirathne et al. | |
| 6,801,940 B1 | 10/2004 | Moran et al. | |
| 6,823,383 B2* | 11/2004 | MacBride | 709/224 |
| 6,836,540 B2* | 12/2004 | Falcone et al. | 379/127.02 |
| 6,841,985 B1 | 1/2005 | Fetzer | |
| 6,882,654 B1 | 4/2005 | Nelson | |
| 6,898,630 B2 | 5/2005 | Ueno et al. | |
| 6,914,892 B1 | 7/2005 | Cooper et al. | |
| 6,925,052 B1 | 8/2005 | Reynolds et al. | |
| 6,944,437 B2 | 9/2005 | Yang et al. | |
| 6,975,209 B2 | 12/2005 | Gromov | |
| 7,027,437 B1 | 4/2006 | Merchant et al. | |
| 7,171,504 B2 | 1/2007 | Ishii | |
| 7,277,957 B2 | 10/2007 | Rowley et al. | |
| 7,308,705 B2 | 12/2007 | Gordy et al. | |
| 7,321,565 B2 | 1/2008 | Todd et al. | |
| 7,324,553 B1 | 1/2008 | Varier et al. | |
| 7,415,013 B1 | 8/2008 | Lo | |
| 7,477,611 B2 | 1/2009 | Huff | |
| 7,486,624 B2 | 2/2009 | Shaw et al. | |
| 7,486,625 B2 | 2/2009 | Matityahu et al. | |
| 7,505,416 B2 | 3/2009 | Gordy et al. | |
| 7,573,896 B2 | 8/2009 | Wang et al. | |
| 7,616,587 B1 | 11/2009 | Lo et al. | |
| 7,760,859 B2 | 7/2010 | Matityahu et al. | |
| 7,788,365 B1* | 8/2010 | Foster et al. | 709/224 |
| 7,953,839 B2* | 5/2011 | Sim et al. | 709/223 |
| 2001/0040870 A1 | 11/2001 | Ohmori et al. | |
| 2002/0003592 A1 | 1/2002 | Hett et al. | |
| 2002/0023184 A1 | 2/2002 | Paul | |
| 2002/0026374 A1 | 2/2002 | Moneymaker et al. | |
| 2002/0032880 A1 | 3/2002 | Poletto et al. | |
| 2002/0061027 A1 | 5/2002 | Abiru et al. | |
| 2002/0073199 A1 | 6/2002 | Levine et al. | |
| 2002/0087710 A1 | 7/2002 | Aiken et al. | |
| 2002/0110148 A1 | 8/2002 | Hickman et al. | |
| 2002/0176355 A1 | 11/2002 | Mimms et al. | |
| 2002/0180592 A1 | 12/2002 | Gromov | |
| 2003/0112760 A1 | 6/2003 | Puppa et al. | |
| 2003/0142666 A1 | 7/2003 | Bonney et al. | |
| 2003/0145039 A1* | 7/2003 | Bonney et al. | 709/202 |
| 2003/0147385 A1 | 8/2003 | Montalvo et al. | |
| 2003/0184386 A1 | 10/2003 | Varner et al. | |
| 2003/0215236 A1 | 11/2003 | Manifold | |
| 2004/0023651 A1 | 2/2004 | Gollnick et al. | |
| 2004/0062556 A1 | 4/2004 | Kubo et al. | |
| 2004/0096227 A1 | 5/2004 | Bulow | |
| 2004/0109411 A1 | 6/2004 | Martin | |
| 2004/0120259 A1 | 6/2004 | Jones et al. | |
| 2004/0128380 A1 | 7/2004 | Chen et al. | |
| 2004/0190547 A1 | 9/2004 | Gordy et al. | |
| 2004/0202164 A1 | 10/2004 | Hooper et al. | |
| 2004/0215832 A1 | 10/2004 | Gordy et al. | |
| 2004/0236866 A1* | 11/2004 | Dugatkin et al. | 709/235 |
| 2004/0264494 A1 | 12/2004 | Kim | |
| 2005/0005031 A1 | 1/2005 | Gordy et al. | |
| 2005/0060535 A1 | 3/2005 | Bartas | |
| 2005/0071711 A1 | 3/2005 | Shaw | |
| 2005/0108444 A1 | 5/2005 | Flauaus et al. | |
| 2005/0122910 A1 | 6/2005 | Parupudi et al. | |
| 2005/0129033 A1 | 6/2005 | Gordy et al. | |
| 2005/0132051 A1 | 6/2005 | Hill et al. | |
| 2005/0213512 A1 | 9/2005 | Konuma et al. | |
| 2005/0231367 A1 | 10/2005 | Bellantoni | |
| 2005/0257262 A1 | 11/2005 | Matityahu et al. | |
| 2005/0271065 A1 | 12/2005 | Gallatin et al. | |
| 2006/0083268 A1 | 4/2006 | Holaday et al. | |
| 2006/0083511 A1 | 4/2006 | Edmunds et al. | |
| 2006/0153092 A1 | 7/2006 | Matityahu et al. | |
| 2006/0200711 A1 | 9/2006 | Schondelmayer et al. | |
| 2006/0215566 A1 | 9/2006 | Walsh | |
| 2006/0233115 A1 | 10/2006 | Matityahu et al. | |
| 2006/0282529 A1 | 12/2006 | Nordin | |
| 2007/0002754 A1 | 1/2007 | Matityahu et al. | |
| 2007/0002755 A1 | 1/2007 | Matityahu et al. | |
| 2007/0002769 A1 | 1/2007 | Matityahu et al. | |
| 2007/0064917 A1 | 3/2007 | Matityahu et al. | |
| 2007/0081549 A1 | 4/2007 | Cicchetti et al. | |
| 2007/0081553 A1 | 4/2007 | Cicchetti et al. | |
| 2007/0171908 A1 | 7/2007 | Tillman et al. | |
| 2007/0171966 A1 | 7/2007 | Light et al. | |
| 2008/0014879 A1 | 1/2008 | Light et al. | |
| 2008/0049627 A1 | 2/2008 | Nordin | |
| 2008/0214108 A1 | 9/2008 | Beigne et al. | |
| 2009/0040932 A1 | 2/2009 | Matityahu et al. | |
| 2009/0041051 A1 | 2/2009 | Matityahu et al. | |
| 2009/0168659 A1 | 7/2009 | Matityahu et al. | |
| 2009/0279541 A1 | 11/2009 | Wong et al. | |
| 2010/0146113 A1 | 6/2010 | Matityahu et al. | |

FOREIGN PATENT DOCUMENTS

| | | |
|---|---|---|
| KR | 10-2004-0058415 A | 7/2004 |
| WO | WO-02/19642 A1 | 3/2002 |
| WO | WO-2004/012163 A2 | 2/2004 |

OTHER PUBLICATIONS

"Written Opinion", Issue in PCT Application No. PCT/US2006/25436; Mailing Date.: Mar. 4, 2008.

"International Preliminary Report on Patentability", Issued in PCT Application No. PCT/US2006/25436; Mailing Date: May 22, 2008.

"International Search Report", Application No. PCT/US2006/25437, Mailing Date: Dec. 6, 2006.

"Written Opinion", Application No. PCT/US2006/25437, Mailing Date: Dec. 6, 2006.

"International Preliminary Report on Patentability", Issued in PCT Application No. PCT/US2006/025437; Mailing Date: Jan. 17, 2008.

"International Search Report", Issued in PCT Application No. PCT/US2008/072484; Mailing Date: Feb. 13, 2009.

"Written Opinion", Issued in PCT Application No. PCT/US2008/072484; Mailing Date: Feb. 13, 2009.

"International Search Report", Issued in PCT Application No. PCT/US2008/072493; Mailing Date: Feb. 13, 2009.

"Written Opinion", Issued in PCT Application No. PCT/US2008/072493; Mailing Date: Feb. 13, 2009.

"International Search Report", Issued in PCT Application No. PCT/US2008/080598; Mailing Date: May 26, 2009.

"Written Opinion", Issued in PCT Application No. PCT/US2008/080598; Mailing Date: May 26, 2009.

"Non Final Office Action", U.S. Appl. No. 12/705,195, Mailing Date: Dec. 27, 2010.

"International Preliminary Report on Patentability", Application No. PCT/US06/25436, Mailing Date: May 22, 2008.

"International Preliminary Report on Patentability", Issued in PCT Application No. PCT/US2008/072484; Mailing Date: Feb. 18, 2010.

"International Preliminary Report on Patentability", Issued in PCT Application No. PCT/US2008/072493; Mailing Date: Feb. 18, 2010.

"European Search Report", Issued in EP Patent Application No. EP 08 17 1759, Mailing Date: Jul. 31, 2009.

U.S. Appl. No. 11/965,668, filed Dec. 27, 2007.

(56) References Cited

OTHER PUBLICATIONS

U.S. Appl. No. 11/925,626, filed Oct. 26, 2007.
U.S. Appl. No. 11/835,233, filed Aug. 7, 2007.
U.S. Appl. No. 11/835,228, filed Aug. 7, 2007.
"Non Final Office Action", U.S. Appl. No. 11/174,033, Mailing Date: May 29, 2008.
"Final Office Action", U.S. Appl. No. 11/174,033, Mailing Date: Dec. 10, 2008.
"Non Final Office Action", U.S. Appl. No. 11/223,477, Mailing Date: Jun. 12, 2008.
"Non Final Office Action", U.S. Appl. No. 11/174,238, Mailing Date: Oct. 1, 2008.
"Non Final Office Action", U.S. Appl. No. 11/370,487, Mailing Date: Mar. 25, 2009.
"Non Final Office Action", U.S. Appl. No. 11/835,233, Mailing Date: Jun. 9, 2009.
"Non Final Office Action", U.S. Appl. No. 11/370,487, Mailing Date: Jun. 11, 2009.
"Non Final Office Action", U.S. Appl. No. 11/174,033, Mailing Date: Sep. 15, 2009.
"Final Office Action", U.S. Appl. No. 11/174,033, Mailing Date: Jun. 24, 2010.
"Non Final Office Action", U.S. Appl. No. 11/174,032, Mailing Date: Apr. 23, 2008.
U.S. Appl. No. 11/370,487, filed Mar. 7, 2006.
"Final Office Action", U.S. Appl. No. 11/835,233, Mailing Date: Oct. 30, 2009.
"Non Final Office Action", U.S. Appl. No. 11/835,233, Mailing Date: Jun. 25, 2010.
"Notice of Allowance and Fee(s) Due", U.S. Appl. No. 11/965,668, Mailing Date: Oct. 8, 2009.
"Non Final Office Action", U.S. Appl. No. 10/834,448, Mailing Date. Feb. 7, 2009.
"Non Final Office Action", U.S. Appl. No. 10/834,448, Mailing Date: Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 18, 2010.
"Application as Filed", U.S. Appl. No. 12/705,195, filed Feb. 12, 2010.
"Non Final Office Action", U.S. Appl. No. 11/835,228, Mailing Date: Sep. 9, 2010.
"Network Status Display", Belkin International, Inc., 2007, 2 pages total.
HP, et al., "Reduced Gigabit Media Independent Interface (RGMII)", Nov. 30, 2005, http://web.archive.org/web/20051113015000/http://www.hp.com/rnd/pdfs/RGMIIv2_0_final_hp. Pdf.
Wikipedia, "Field-programmable Gate Array", Jan. 21, 2005, http://web.archive.org/web/20050121193052/http://en.wi kiped ia.org/wiki/Field-programmable_gate_array.
Xilinx, "LogiCore OPB Ethernet Lite Media Access Controller", v1.01b, Mar. 3, 2006.
"Non Final Office Action", U.S. Appl. No. 11/174,033, Mailing Date: Apr. 28, 2011.
"Fast Ethernet Fiber-to-Fiber Converters", Canary Communications, Inc. 7 pages total, 2004.
"Sequence reducer/ Sequence Mirror Operator's Guide", Peribit Networks, Inc. 13 pages total. 2001-2005.
"PeriScope Central Management System (CMS) 5.0 Administrator's Guide", Peribit Networks, Inc. 13 pages total. 2003-2004.
"VSS Coppertap Literature", VSS Monitoring Inc. 2 pages. 2003-2004.
"VSS Easy Install Guide", VSS Monitoring Inc. 8 pages total. 2003-2005.
"VSS Linksafe", VSS Monitoring Inc., 1 page. 2003-2005.
Anonymous, "100Base-TX/100BBase-FX Media Converters E-100BTX-FX-04 User's Guide", Transitions Networks, Inc. Copyright 1998-2000, 4 pages.
"Replacement Statement and Explanation under 37CFR 1.915 In Support of Request for Inter Partes Reexamination of US Patent 7,486,625", Sonnenschein Nath & Rosenthal LLP, Jan. 22, 2010, 251 pages.
"Request for Inter Partes Reexamination of US Patent 7,486,625", Sonnenschein Nath & Rosenthal LLP, Dec. 18, 2009, 69 pages.
Gigamon Systems LLC, "GigaVUE—Product Brief", Gigamon Systems LLC, http://web.archive.org/web/20070815021951/www.gigamon.com/pdf/GigamonSystems-OnePageProductBrief.pdf, Aug. 15, 2007, 1 page.
"Inter Partes Reexamination Office Action", U.S. Appl. No. 95/001,318, Patent in Re-examination: 7,486,625, Mailing Date: Apr. 23, 2010.
"International Search Report", PCT Application No. PCT/US2011/026158, Mailing Date: Nov. 30, 2011.
"Written Opinion" PCT Application No. PCT/US2011/026158, Mailing Date: Nov. 30, 2011.
"Non Final Office Action" U.S. Appl. No. 12/174,404, Mailing Date: Apr. 2, 2012.
"Final Office Action", U.S. Appl. No. 11/174,033, Mailing Date: Mar. 27, 2012.
"Final Office Action", U.S. Appl. No. 11/174,033, Mailing Date: Jan. 11, 2012.
"Examination Report", EP Patent Application No. EP 08 17 1759, Mailing Date: Jun. 8, 2012.
"Non Final Office Action", U.S. Appl. No. 13/036,842, Mailing Date: Oct. 17, 2012.
"Non Final Office Action", U.S. Appl. No. 13/230,760, Mailing Date: Oct. 4, 2012.

\* cited by examiner

INTELLIGENT COMMUNICATIONS NETWORK TAP PORT AGGREGATOR AND METHODS THEREOF

PRIORITY CLAIM

This application is a continuation application and claims priority under 35 U.S.C. §120 to a commonly assigned application entitled "Intelligent Communications Network Tap Port Aggregator," by Matityahu et al., application Ser. No. 11/370,487, filed on Mar. 7, 2006, which issued as U.S. Pat. No. 7,760,859 B2 on Jul. 20 2010, which claims priority to U.S. Provisional Patent Application No. 60/659,512 filed Mar. 7, 2005, and to U.S. Provisional Patent Application No. 60/709,371 filed on Aug. 17, 2005, which are all incorporated by reference herein.

FIELD

The present invention relates to an intelligent communications network tap.

BACKGROUND

Communication networks are important for providing data and voice communication. Monitoring networks is important to ensure reliable operation, fault detection, timely mitigation of potentially malicious activities, and more. Network taps are generally known in the art for connecting to networks and providing a port to monitor the communication traffic on the network.

Conventional network taps may be configured to provide network traffic to an independent monitor such as a network analyzer, an intrusion detection system or intrusion prevention system, and so forth. However, conventional network taps do not provide real-time display on the tap that may be used by systems administrators and network technicians to quickly and easily understand network traffic loads and patterns. The lack of real-time display may, in some examples, hinder ready detection of network problems. For example, damaging spikes may strike and pass before useful detection and analysis can occur.

Further, network communication management devices may be, in some conventional systems may be accomplished locally, or through dedicated connections. In locally concentrated networks, dedicated management tools may be effective. However, as is often the case, networks may be physically remote or spread across a wide geographic area. When remote networks are being managed, web-based and SNMP enabled management tools may provide more effective and immediate network management by providing a general access protocol that is readily available. Still further, even where local access is required, new and innovative methods of accessing, for example, a bank of network monitors by a wireless connection may be desirable.

Still further, conventional systems utilize a single network interface card (NIC) for accessing a network. Where full-duplex monitoring is required, at second NIC or a dual channel NIC may be utilized to tap into each side of a tapped full-duplex connection. However, additional NICs may further complicate configurability and flexibility. Further, costs associated with redundant equipment may be undesirable.

Consequently, there is need for an improved intelligent communications network tap that provides real-time network traffic information.

DESCRIPTION OF THE DRAWINGS

The foregoing and other features, aspects, and advantages will become more apparent from the following detailed description when read in conjunction with the following drawings, wherein.

DESCRIPTION

The present invention provides an improved intelligent communications network tap that provides real-time network traffic information.

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Wire and optical transport technologies can be used in the invention including Gigabit and 10 Mega bits per second (Mbps) or 100 Mbps, often denoted as 10/100. Likewise, reference is made to packets and cells, while other forms of data and addresses can be used in the invention.

A. Architecture and Operation

Figure 1:
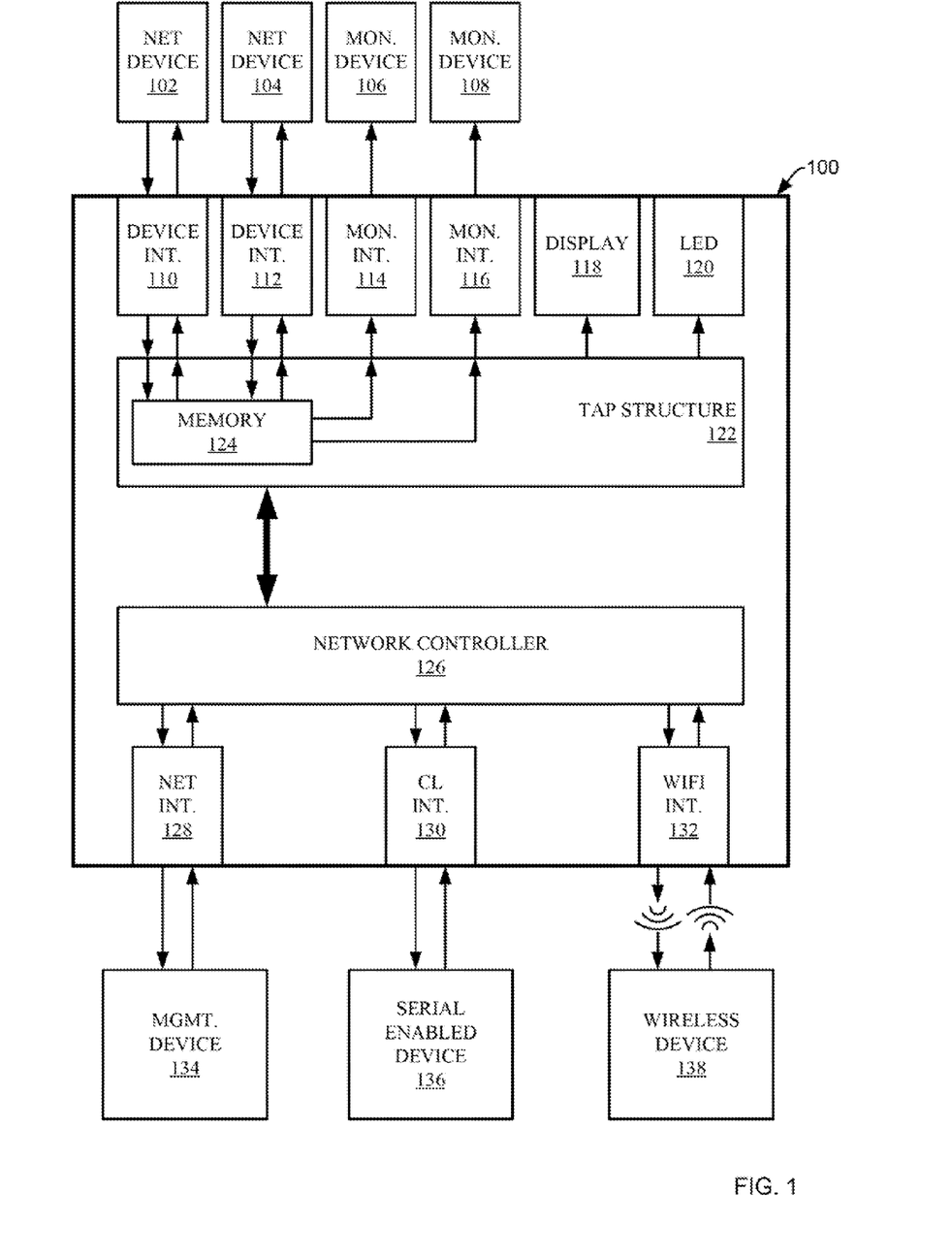
FIG. 1 depicts an intelligent network tap according to an embodiment of the invention.

FIG. 1 depicts an intelligent network tap port aggregator 100 according to an embodiment of the invention. An intelligent network tap port aggregator for use in monitoring one or more network feeds comprises, in some embodiments, a first device interface terminal 110 configured to receive a first network feed from device 102 and a second device interface terminal 112 configured to receive a second network feed from device 104. In one embodiment, the connection terminals are standard RJ45 jacks that permit devices 102 and 104 to be coupled to the terminals with standard CAT5 cable. However, in an optical embodiment, the terminals would be optical terminals. As may be appreciated, devices 102 and 104 may include, without limitation, any number of network devices for example: routers, firewalls, switches, or any other type of network device well-known in the art without departing from the present invention.

Device interface terminals 110 and 112 may be coupled with tap structure 122. In some embodiments, tap structure 122 may be configured to aggregate network feeds from devices 102 and 104. In conventional systems, a full-duplex monitoring system having a network tap requires two NICs (or a dual channel NIC)—one interface for each side of a tapped full-duplex connection. Tap structure 122, as described herein, aggregates network feeds. Aggregated streams are then regenerated and sent to monitor interface terminals 114 and 116. Each monitor interface terminal may then be coupled with a network monitor device 106/108. Thus, tap structure 122 may be configured to communicate full-duplex network traffic between devices 102 and 104. Tap structures may also provide other services in embodiments of the present invention such as, for example, heartbeat, matrix switch, regenerator switch, ling aggregator, and 10/100 gigatap. Furthermore, any number of network monitor devices may be utilized without departing from the present invention such as, for example, network analyzers, intrusion detection systems, intrusion prevention systems, remote monitors, and probes.

In order to facilitate and enhance network traffic management, a memory buffer 124 may be coupled with the tap structure and configured to temporarily store data. Memory buffers may be useful in a scenario where a network data burst temporarily exceeds the tap structure's ability to support the network traffic. In one aspect, the memory buffer includes portions dedicated to each of the devices, e.g., 32 MB per side. In some embodiments, such a memory buffer is a first-in-first-out (FIFO) memory that may be configured to automatically clears itself when the traffic volume drops back to the receiving capacity of a network interface card (NIC). In some embodiments, the size of the memory buffer is approximately 256 MB.

A display structure 118 may also be coupled to the tap structure 122 in some embodiments. In one example, display structure 118 is an LCD display of 2×20 characters. Aspects of the invention include graphical display modes and other displays, e.g., bars and graphs that can provide additional technical and diagnostic information. Display 118 may show, for example, network parameters corresponding to a network feed such as: instantaneous percent utilization of network capacity, average percent utilization of network capacity, highest peak percent utilization of network capacity, and time of highest peak percent utilization of network capacity network traffic in terms of percent bandwidth utilization. Additional examples of network parameters may include: traffic types, particular origin and/or destination addresses, fault conditions, etc. Network parameters may be updated periodically and displayed for a network technician to read at any time. In some embodiments display parameters can be cycled, for example, by displaying a parameter for a predetermined period of time and then cycling through selected parameters continuously. In one aspect, a button may be provided to allow a user to select a network parameter for display. In another aspect, the selection and management of the display parameters is performed by a management device.

Intelligent network tap port aggregator 100 may be managed from a number of device structures. In order to provide managing capabilities, a network controller 126 may be coupled with tap structure 122. Network controller 126 may be configured to provide communication between tap structure 122 and a variety of managing devices via several managing device interfaces (i.e. 128, 130, and 132). For example, net interface 128 may be configured to send and receive data over a web based device 134 thus enabling a browser based web manager. Further, net interface 128 may be configured to send and receive data over an SNMP enabled device 134. Each of these devices may provide local as well as remote control of intelligent network tap port aggregator 100. Communication protocols for providing web based control and SNMP control are generally well-known in the art and may be utilized without limitation without departing from the present invention.

In one aspect of the invention, device 134 is an administrative terminal (e.g. computer terminal) with a user interface for a network technician to manage intelligent network tap port aggregator 100. An administrative terminal connected to the intelligent network tap port aggregator may perform a number of functions including: (a) setting and modifying tap parameters based on user requirements; (b) setting and modifying tap display and LED parameters based on customer requirements; (c) recording network statistics based on customer requirements; and (d) alerting network technicians in the event of an alarm condition with a notification message (e.g. by on-screen information, e-mail, page, or other communication technique). Additional settings and monitoring are anticipated.

In another embodiment, command line interface 130 may be configured to send and receive data over a serial enabled device 136. Command line instructions may provide for local configuration and management of intelligent network tap port aggregator 100. Still further, in another embodiment, wireless interface 132 may be configured to send and receive data over a wireless enabled device 138. In one embodiment, wireless communication may be configured using an IEEE 802.11b protocol. As may be appreciated, any suitable wireless protocol may be utilized without departing from the present invention. Wireless management, as described herein, allows a technician to wirelessly access an intelligent network tap port aggregator within a suitable proximity such that security may be preserved.

In some embodiments, an LED array 120 may also be coupled with tap structure 122. As may be appreciated, an LED array may comprise one or more light emitting diodes (LED) illuminated in response to network conditions. LED arrays may include any number of colored elements. For example, a green LED may be utilized to indicate that a particular network parameter is within allowable limits or below a pre-selected threshold. A yellow LED may be utilized to indicate that a particular network parameter is borderline or at a pre-selected threshold. Further, a red LED may be utilized to indicate that a particular network parameter is above allowable limits or above a pre-selected threshold (e.g. an alarm condition). In one embodiment, the network parameter may correspond to network capacity. Other network parameters along with corresponding thresholds may be selected as well using managing devices as described above without departing from the present invention.

In one embodiment, intelligent network tap port aggregator 100 further includes a redundant power supply (not shown) for increased reliability. For example, if one power source fails, another redundant power supply is automatically switched to ensure uptime. LED array 120 may be configured to indicate which power supply is active so that a fault can be quickly identified and repaired without lowing power to the tap and without loss of data to the monitor.

B. Methodology

Figure 2:
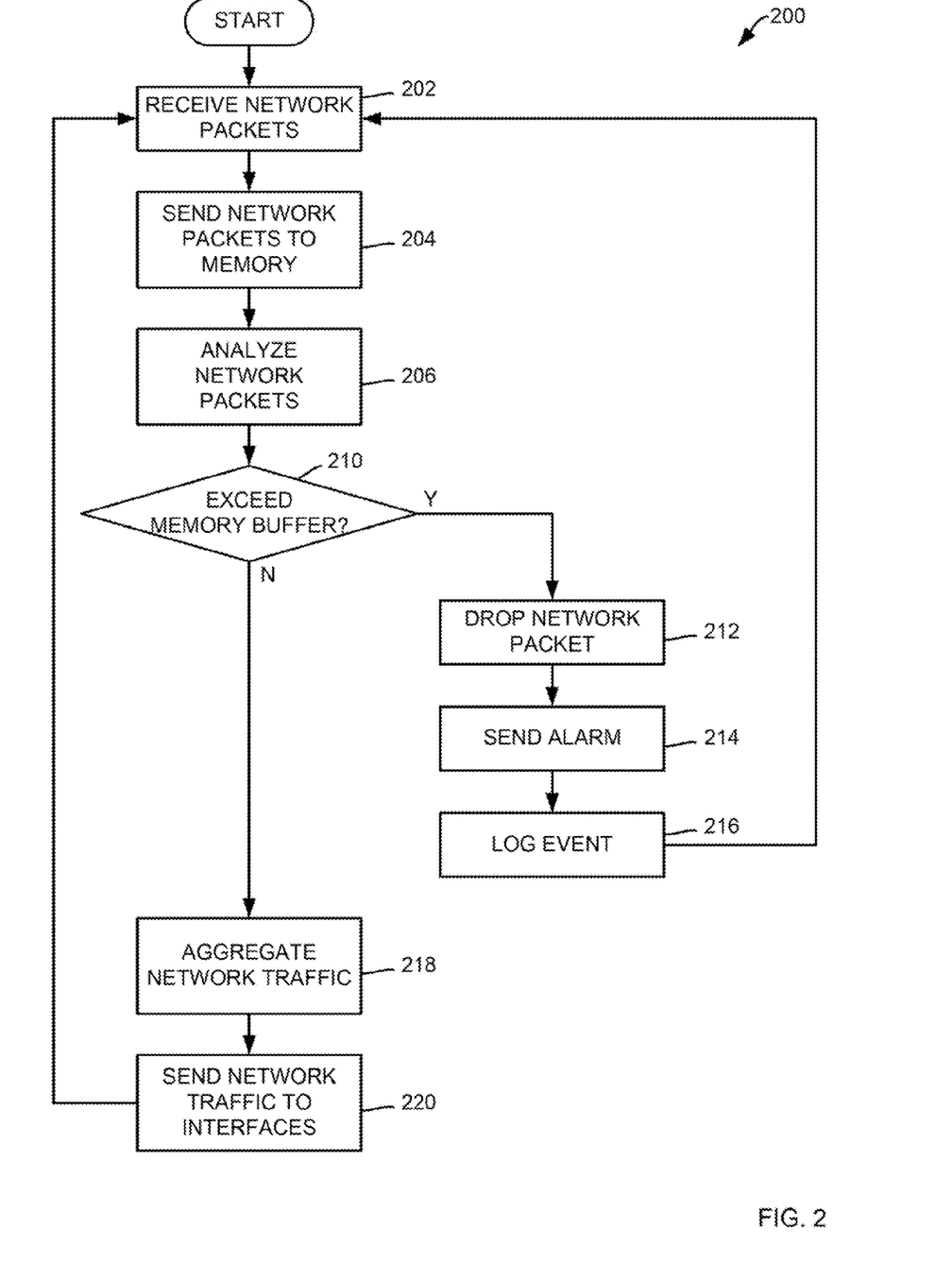
FIG. 2 is a flowchart illustrating steps for performing a method of aggregating network traffic according to an embodiment of the invention.

FIG. 2 is a flowchart illustrating steps for performing a method of aggregating network traffic 200 according to an embodiment of the invention. At a first step 202, network packets are received. As noted above, network packets (i.e. network traffic) may be received through a number of device interface terminals. In one embodiment device interface terminals may be configured to receive network packets over a twisted pair. In another embodiment, device interface terminals may be configured to receive network packets over an optical connection. As may be appreciated, any number of configurations well-known in the art may be utilized without departing from the present invention.

At a next step 204, the method sends network packets to memory. Memory buffer is useful in a scenario where a network data burst temporarily exceeds the tap structure's ability to support the network traffic. In one aspect, the memory buffer includes portions dedicated to each of the devices, e.g., 32 MB per side. In some embodiments, such a memory buffer is a first-in-first-out (FIFO) memory that may be configured to automatically clears itself when the traffic volume drops back to the receiving capacity of a network interface card (NIC). In some embodiments, the size of the memory buffer is approximately 256 MB. As noted above, in some embodiments, more than one network feed may be utilized. As such, memory may be segmented and configured such that each segment may be dedicated to a particular network feed thus receiving packets only from that network feed.

At a next step 206, network packets may be analyzed. As may be appreciated, analysis may include generating network parameters corresponding to a network feed such as: instantaneous percent utilization of network capacity, average percent utilization of network capacity, highest peak percent utilization of network capacity, and time of highest peak percent utilization of network capacity network traffic in terms of percent bandwidth utilization. Additional examples of network parameters may include: traffic types, particular origin and/or destination addresses, fault conditions, etc. Network parameters may be updated periodically and displayed for a network technician to read at any time. In some embodiments, selected network parameters may be displayed locally.

At a next step 210 the method determines whether the memory buffer has been exceeded by a packet. That is, whether a received packet will cause a memory overflow condition. If the method determines that the memory buffer is exceeded, then the packed may be dropped at a step 212. Thereafter, the method, at a step 214, sends a message notification such as an alarm. In some embodiments, the method may illuminate an LED array in response to an alarm condition. The method then logs the event at a step 216 and continues to a step 202 to receive network packets.

If, at a step 210, the method determines that the memory buffer has not been exceeded, the method continues to a step 218 to aggregate network traffic. As noted above, more than one network feed may be utilized. Aggregation combines two network feeds into a single aggregated stream. Aggregation is generally well-known in the art and may be utilized without limitation without departing from the present invention.

After network traffic is aggregated, the method then sends the aggregated traffic to a number of monitor interface terminals. Monitor interface terminals may be accessed by independent monitor devices that may be utilized to determine the status of the network. Any number of independent monitors may be utilized without departing from the present invention such as, for example, network analyzers, intrusion detection systems, intrusion prevention systems, remote monitors, and probes. After aggregated traffic is sent to a number of monitors, the method returns to a step 202 to receive network packets.

Figure 3:
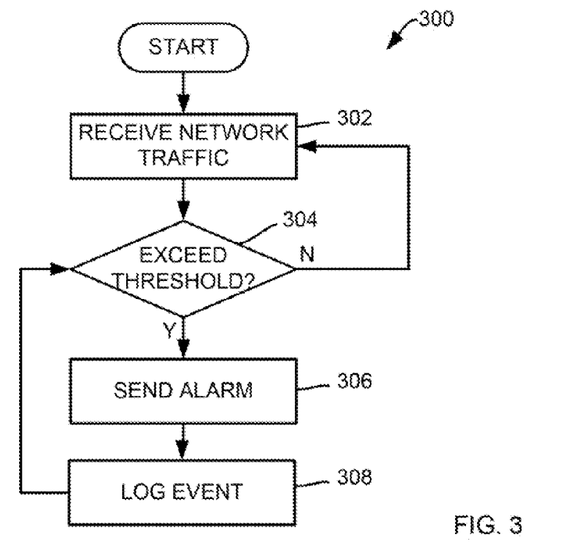
FIG. 3 is a flowchart illustrating steps for performing a method of determining a network threshold according to an embodiment of the invention.

FIG. 3 is a flowchart illustrating steps for performing a method of determining a network threshold 300 according to an embodiment of the invention. In some embodiments, parallel processes may be utilized. For example, a selected threshold for warning may be utilized to alert a network administrator to potential network issues. Thus, at a first step 302, network traffic is received. As noted above, network traffic may be received through a number of device interface terminals. In one embodiment, device interface terminals may be configured to receive network packets over a twisted pair. In another embodiment, device interface terminals may be configured to receive network packets over an optical connection. As may be appreciated, any number of configurations well-known in the art may be utilized without departing from the present invention.

At a next step 304, the method determines whether a pre-selected threshold has been exceeded. As may be appreciated, network capacity may be subject to hardware limitations, software limitations, or both. In one embodiment, a network threshold may be a configurable parameter. In other embodiments, network thresholds may be configurable remotely. As may be appreciated, exceeding network capacity may result in an unacceptable increase in errors due to, for example, dropped or lost packets. As such, thresholds may represent a percentage of usage, an absolute number of packets sent, or any other measure of network traffic flow without departing from the present invention. If the method determines, at a step 304, that a pre-selected threshold has been exceeded, the method continues to a step 306 to send a message notification such as an alarm. In some embodiments, the method may illuminate an LED array in response to an alarm condition. The method then logs the event at a step 308 and continues to a step 302 to receive network traffic.

Figure 4:
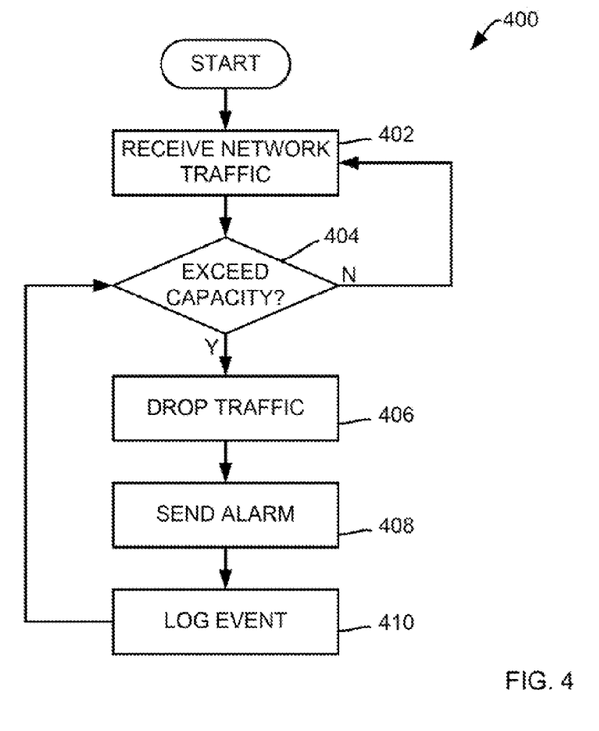
FIG. 4 is a flowchart illustrating steps for performing a method of determining excess network traffic according to an embodiment of the invention.

FIG. 4 is a flowchart illustrating steps for performing a method of determining excess network traffic 400 according to an embodiment of the invention. In some embodiments, parallel processes may be utilized. For example, an excess capacity warning may be utilized to alert a network administrator to potential network issues. Thus, at a first step 402, network traffic is received. As noted above, network traffic may be received through a number of device interface terminals. In one embodiment device interface terminals may be configured to receive network packets over a twisted pair. In another embodiment, device interface terminals may be configured to receive network packets over an optical connection. As may be appreciated, any number of configurations well-known in the art may be utilized without departing from the present invention.

At a next step, 404, the method determines whether network capacity has been exceeded. As may be appreciated, network capacity may be subject to hardware limitations, software limitations, or both. In one embodiment, network capacity may be a configurable parameter. In other embodiments, network capacity may be configurable remotely. As may be appreciated, exceeding network capacity may result in an unacceptable increase in errors due to, for example, dropped or lost packets. If the method determines at a step 404 that network capacity is exceeded, the method continues to drop traffic at a step 406 whereupon a notification message such as an alarm may be sent at a step 408. In some embodiments, the method may illuminate an LED array in response to an alarm condition. The method then logs the event at a step 410 and continues to a step 402 to receive network traffic.

C. Implementation

Figure 5:
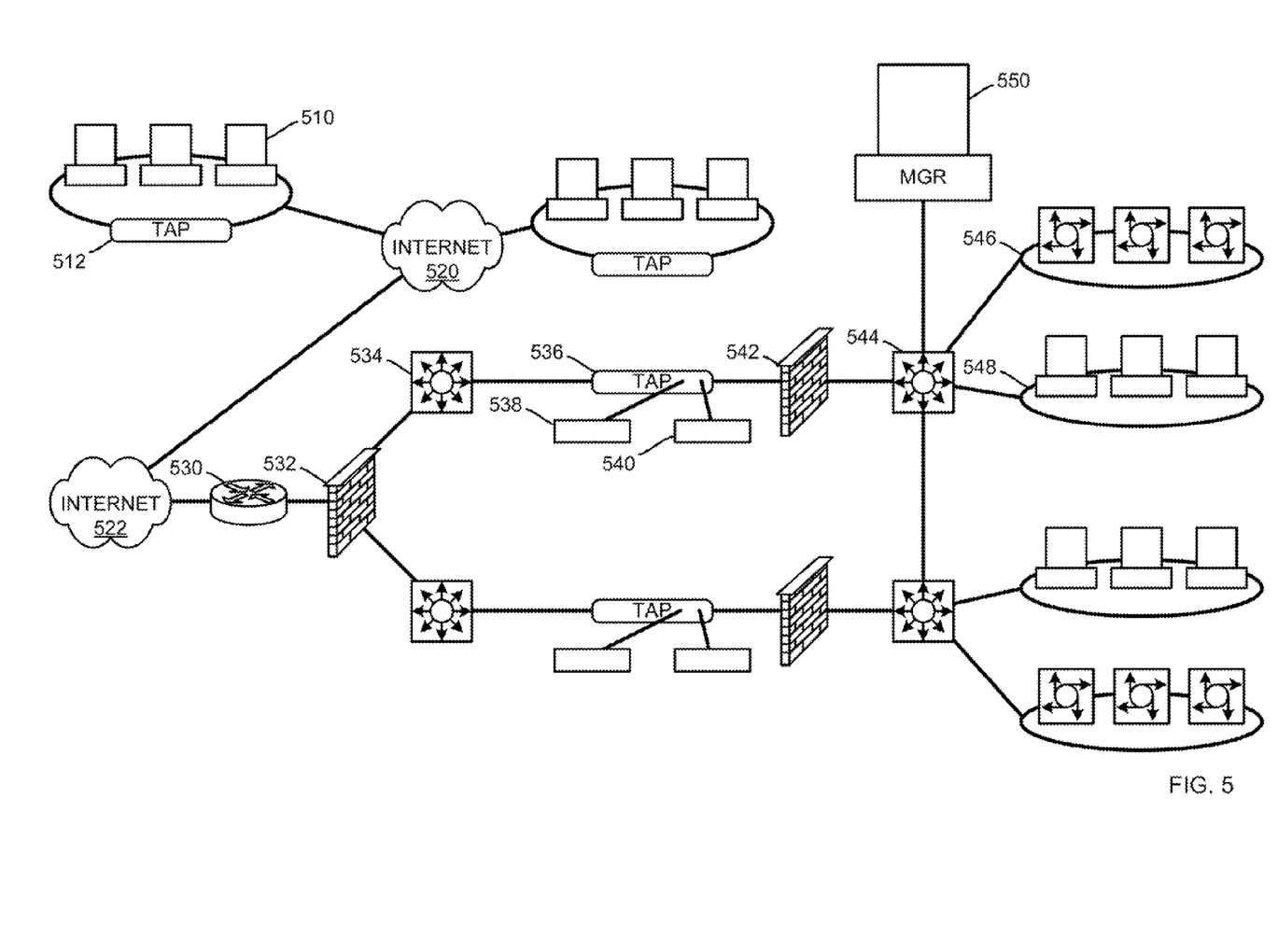
FIG. 5 is an illustrative block diagram of implementations of embodiments in accordance with the present invention.

FIG. 5 is an illustrative block diagram of implementations of embodiments in accordance with the present invention. As may be appreciated, embodiments of the present invention may find utility in a variety of contexts. For example, a first embodiment 512 may be utilized in coordination with a local network 510. As may be appreciated, any number of CPUs may be utilized in network 510. First embodiment 512 may be utilized to aggregate network feeds and monitor network activity of network 510. Local management of first embodiment 512 may be accomplished using devices as described above. Remote management of first embodiment 512 may be accomplished using management device 550. Management devices are described in further detail above. While management device 550 is illustrated as being connected through a variety of segments including interne 520, internet 522, router 530, firewall 532, switch 534, second embodiment 536, firewall 542, and switch 544, these segments are for illustrative purposes only and should not be construed as limiting in any way.

Second embodiment 536 may further include monitoring devices 538 and 540. As noted above, any number of network monitor devices may be utilized without departing from the present invention such as, for example, network analyzers, intrusion detection systems, intrusion prevention systems, remote monitors, and probes. Those skilled in the art will appreciate the utility of flexible networking arrangement for managing network segments. As may be seen second embodiment 536 may monitor network traffic for a variety of network elements including local network 548 and local servers 546.

As may be appreciated, advantages of embodiments of the present invention may include, for example:

1. Provide critical data without complex setup. Embodiments described may be connected with each half-duplex link that is to be aggregated;
2. Display real-time network parameters as described above;
3. Monitor all aggregated network fees including physical layers;
4. Manage embodiments remotely through web based services, SNMP applications, and TMS applications; and
5. Provide readily visible status indicators through use of an LED array.

D. Conclusion

Variations in the disclosed embodiments are anticipated. For example, this invention and related technology is applicable to a wide range of products. These other products may or may not have memory, may have more than three ports, or maybe less than three ports, etc.

Advantages of the invention include the ability to provide full-duplex monitor access to a network in order that the network can be monitored and also that the tap can display network parameters to the network technicians.

Having disclosed exemplary embodiments and the best mode, modifications and variations may be made to the disclosed embodiments while remaining within the subject and spirit of the invention as defined by the following claims.

The invention claimed is:

1. A network tap port aggregator for use in monitoring a network, said network tap port aggregator comprising:
    a first device interface terminal for receiving a first network feed;
    a second device interface terminal for receiving a second network feed;
    a tap structure coupled with said first device interface terminal and with said second device interface terminal, said tap structure configured to monitor said first network feed and said second network feed and to aggregate said first network feed and said second network feed into an aggregated network feed; and
    a first monitor interface terminal coupled to said tap structure for providing said aggegated network feed to a first network monitor that is external to said network tap port aggregator.

2. The network tap port aggregator of claim 1 further comprising a display coupled to said tap structure and configured to display at least one selected first network parameter corresponding to said first network feed and at least one selected second network parameter corresponding, to said second network feed.

3. The network tap port aggregator of claim 2 further comprising a network controller coupled with said tap structure for providing communication between said tap structure and a plurality of managing devices external to said network tap port aggregator.

4. The network tap port aggregator of claim 3 further comprising a managing device interface coupled with said network controller for providing at least one of Internet access to said network controller, SNMP access to said network controller, Command Line Interface (CLI) access to said network controller, and wifeless access to said network controller.

5. The network tap port aggregator of claim 2 wherein said at least one selected first network parameter and said at least one selected second network parameter are selected from a group comprising at least one of instantaneous percent utilization of network capacity, average percent utilization of network capacity, highest peak percent utilization of network capacity, and time of highest peak percent utilization of network capacity.

6. The network tap port aggregator of claim 1 farther comprising a memory buffer coupled with said tap structure and configured to store data, wherein said memory buffer is configured to store burst network data.

7. The network tap port aggregator of claim 1 further comprising a second monitor interface terminal coupled to said tap structure for providing said aggregated network feed to a second network monitor that is external to said network tap port aggregator.

8. The network tap port aggregator of claim 7 wherein said tap structure is configured to communicate full-duplex network traffic between a first device coupled to said first monitor interface terminal and a second device coupled to said second monitor interface terminal.

9. The network tap port aggregator of claim 7 Wherein said first network monitor and said second network monitor are selected from a groups of systems, wherein said group of systems including at least one of network analyzers, intrusion detection systems, intrusion prevention systems, remote monitors, and probes.

10. The network tap port aggregator of claim 1 further comprising an LED array that is coupled to said tap structure configured to illuminate in response to at least one pre-selected threshold percent utilization of first network capacity of said first network feed and to at least one pre-selected threshold percent utilization of second network capacity of said second network feed.

11. A network tap port aggregator for use in monitoring a network, said network tap port aggregator comprising:
    a first device interface terminal for receiving a first network feed;
    a second device interface terminal for receiving a second network feed;
    a tap structure coupled with said first device interface terminal and with said second device interface terminal, said tap structure configured to monitor said first network feed and said second network feed and to aggregate said first network feed and said second network feed into an aggregated network feed; and
    a display coupled to said tap structure and configured to display at least one selected first network parameter corresponding to said first network feed and at least one selected second network parameter corresponding to said second network feed.

12. The network tap port aggregator of claim 11 further comprising a first monitor interface terminal coupled to said tap structure for providing said aggregated network feed to a first network monitor that is external to said network tap port aggregator; and
    a second monitor interface terminal coupled to said tap structure for providing said aggregated network feed to a second network monitor that is external to said network tap port aggregator.

13. The network tap port aggregator of claim 12 further comprising a network controller coupled with said tap structure for providing communication between said tap structure and a plurality of managing devices external to said network tap port aggregator.

14. The network tap port aggregator of claim 12 further comprising a managing device interface coupled with said network controller for providing at least one of Internet access to said network controller, SNMP access to said network controller, Command Line Interface (CLI) access to said network controller, and wifeless access to said network controller.

15. The method of claim 11 further comprising:
illuminating an LED array that is coupled to said tap structure in response to said at least one selected first network parameter and to said at least one selected second network parameter.

16. The method of claim 11 further comprising:
temporarily storing said first network feed in a memory buffer that is con fled to said tap structure; and
temporarily storing said second network feed in said memory buffer, wherein said memory buffer is a FIFO buffer.

17. A method of monitoring network traffic utilizing a network tap port aggregator, said method comprising:
receiving a first network feed through a first network interface coupled with a tap structure in said network tap port aggregator;
receiving a second network feed through a second network interface coupled with said tap structure in said network tap port aggregator;
monitoring said first network feeds and second network feeds to provide at least one selected first network parameter corresponding to said first network feed and at least one selected second network parameter corresponding to said second network feed;
aggregating said first network feed and said second network feed into an aggregated network feed; and
passing said aggregated network feed to a set of monitor interface terminals that is external to said network tap port aggregator.

18. The method of claim 17 further comprising accessing said tap structure through at least one managing device interface coupled with a network controller, said network controller is coupled with said tap structure.

19. The method of claim 17 further comprising displaying said at least one selected first network parameter and said at least one selected second network parameter on a remote display, said remote display connected with a network controller that is coupled to said tap structure through at least one managing device interface.

20. The method of claim 19 further comprising using said remote display to further display configurable parameters selected from a group comprising of at least one of IP address, net mask, network capacity, network utilization threshold, network peak rate reset, network statistics reset, and current date and time.

* * * * *